United States Patent Office 3,174,496
Patented Mar. 23, 1965

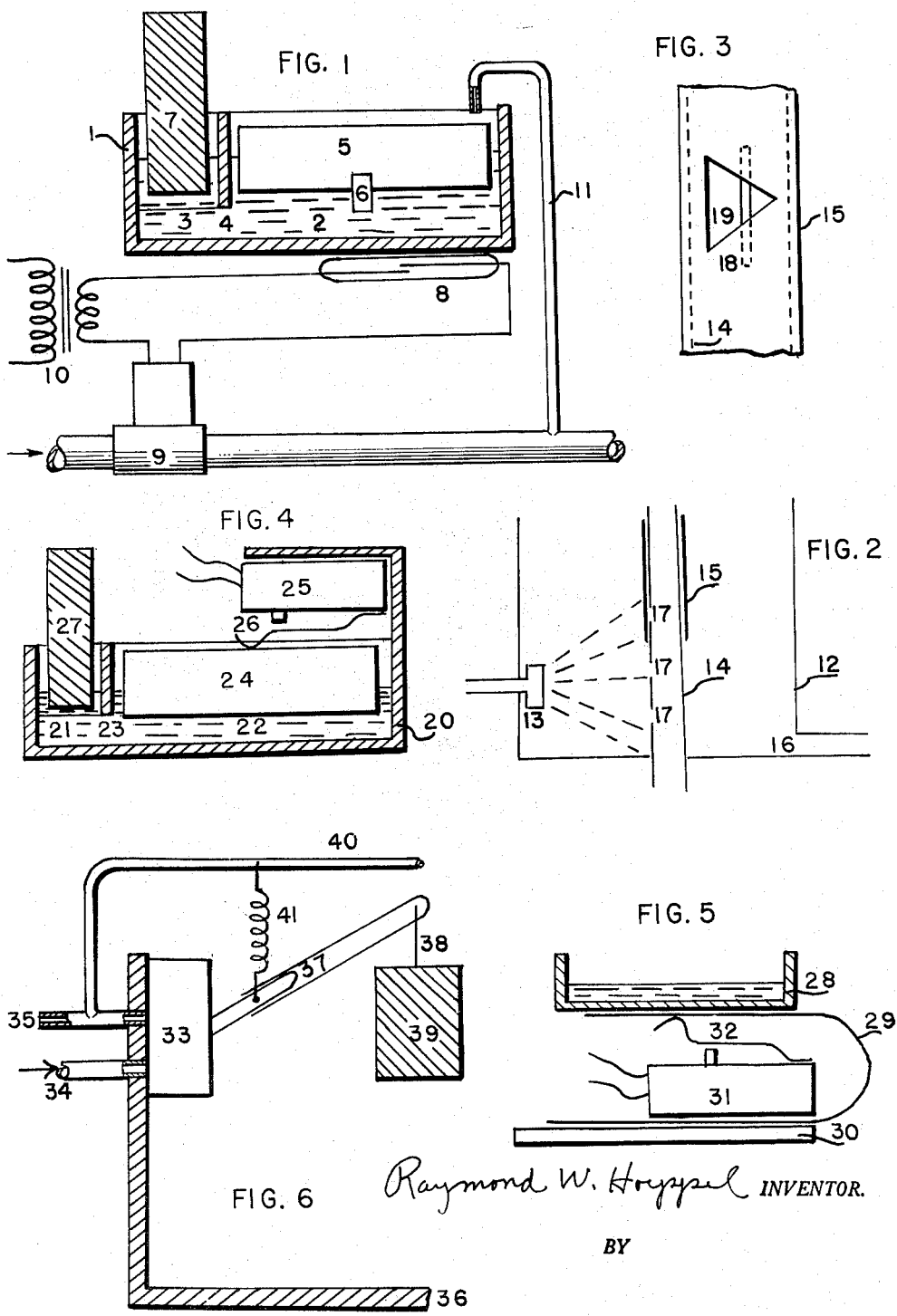

3,174,496
AUTOMATIC IRRIGATION CONTROL SYSTEM
Raymond W. Hoeppel, P.O. Box 5, Oak View, Calif.
Filed Aug. 14, 1961, Ser. No. 131,373
11 Claims. (Cl. 137—78)

This invention relates generally to method and systems for automatically controlling the intermittent flow of water, and more specifically to the automatic control of flow with respect to the natural evaporative tendency of the atmosphere.

Automatic control systems usually require the use of a time switch to program periods of water application. Where the water is to be used for agricultural applications, such automatic apparatus will apply water to the plants on moist or rainy days, when water is not needed and when it may even be detrimental, and it may not provide enough applications of water over hot dry windy periods.

An object of this invention is to provide an automatic water control system which will intermittently apply water to an area in accordance with the needs of plants, or other water evaporative systems, for such water.

Another object is to provide an automatic water control system which will intermittently provide water in direct relationship to the natural tendency of the atmosphere to evaporate water.

Another object is to provide a means for controlling the period between applications of water and for controlling the length of time of each application of water. Where the water is used for agriculture, the period between applications and the length of time of each application should vary with soil type and type of plants being grown. As stated above, the period between applications of water also should vary with the natural evaporative tendency of the atmosphere.

A method of attaining this more desirable method of water application utilizes a valve to control the flow of water which is in turn controlled by a snap acting valve control means which is actuated upon receiving a small portion of the water passing through the valve, with further provision for the slow natural evaporation of the received water that actuates the valve control means and the eventual opening of the valve after a definite portion of the water received has evaporated from the valve control means.

In the accompanying drawings, illustrative of presently preferred embodiments of this invention, but intended only as examples and not as limitations, FIGURE 1 is a view in cross section of a complete water control system incorporating a water operated float switch, FIGURE 2 is a view in cross section of a non-clogging liquid divider, FIGURE 3 is a front view of one type of variable orifice for the liquid divider, FIGURE 4 is a view in cross section of another type of water operated float switch, FIGURE 5 is a cross section view of a snap acting switch operated by the weight of water received and FIGURE 6 is a cross section view of a complete non-electric water control system incorporating a snap acting toggle valve.

Having reference to the details of the drawings, the control switch of FIG. 1 consists of a container, 1, which must be constructed of non-magnetic material, which comprises two compartments, float compartment 2 and evaporative compartment 3, interconnected by port, 4. In compartment 2 is a float, 5, to which is attached a permanent magnet, 6. In compartment 3 is a sponge, 7, which protrudes into the atmosphere above the water level in the float switch. Any water absorbent material having sufficient capillarity to fill its pores with water on partial immersion, such as unglazed ceramic, may be substituted for the sponge. Adjacent to the magnet is located a normally open magnetic reed switch, 8, which is actuated by the field of the magnet even though some distance away from the magnet, but which is de-actuated when the magnet moves a definite distance away from the switch. The switch may be a single pole single or double throw type. A normally closed electric valve, 9, located in the main water line controls the flow of water to the irrigation system, which is in turn controlled by switch, 8, by power furnished by transformer 10. A small portion of the water passing the electric valve is fed back to the float switch container, 1, via a small diameter pipe, 11.

The construction and operation of this float switch, and also of certain other devices to be later discussed, has been described in my co-pending application Serial No. 62,291, filed Oct. 12, 1960, now abandoned. Upon evaporation of water from compartments 2 and 3, float 5 slowly falls, lowering magnet 6 until the distance between the magnet and switch 8 is diminished to the point where the field of the magnet closes switch 8, thus energizing and opening the electrically operated valve 9 and allowing water to flow to the irrigation system. At the same time a minute portion of this water is very slowly fed back to container 1 so that the float slowly rises until the field of the magnet at switch 8 is diminished to the point where it can no longer hold switch 8 closed. At this level, switch 8 rapidly opens, closing valve 9 and stopping the flow of water. Then upon slow evaporation of the water in container 1 the above process is repeated.

In the switch of FIGURE 1, the magnet may be a horseshoe type. The magnet may be located at the side of the float, horizontal to the water surface, in which instance the reed switch is mounted vertically along the side of the container adjacent to the path of travel of the magnet. The positions of the magnet and reed switch are of course interchangeable without affecting the operation of the device.

In the described float switch, and also in the float switch of FIGURE 4, the sponge need not be used if the surface area of the evaporative compartment is large enough to permit adequate evaporation of the water. This evaporative compartment may be omitted completely if the sponge is inserted vertically through sealed tunnels in the float so that the lower portion of the sponge dips into the water and the upper portion protrudes into the air. Several sponges or absorbent substances may be used to accelerate evaporation. The evaporation rate also may be controlled by varying the surface area of the sponge that is exposed to the air, such as by varying the sponge length or by partially shielding the sponge from the air by means of a water impermeable barrier.

Another type of electric float switch, that is not however quite as dependable as that previously described, is shown in FIGURE 4. Here, a container, 20, is comprised of two compartments, the float compartment, 22, and the evaporation compartment, 21, in which a sponge, or other absorbent material, 27, may be inserted to accelerate the evaporation rate. Compartments 21 and 22 are interconnected by a port, 23. The float, 24, operates a snap acting switch, 25, by pressing against a lever, 26, when the water level rises, thus opening the switch and closing the switch when this pressure is released when the float descends. Snap acting switches that may be used in this device are the well-known microswitch or a mercury switch. Preferably the switch and elever arm should be so designed that the vertical movement of the float to open and close the switch should be at least two millimeters. This float switch can be substituted for the float switch in the complete water control system shown in FIGURE 1.

Also, the gravity actuated switch shown in FIGURE 5 may be substituted for the float switch in the complete water control system shown in FIGURE 1. Here a container, 28, is mounted on a leaf spring, 29, which is in turn fastened to a base, 30. A snap acting electric switch, 31, with its actuating arm, 32, is mounted beneath the container, so that its arm is actuated by pressure of the bottom of the container on its surface. As container 28 receives water, the weight of the water overcomes some of the bias in spring 29, causing the container to move downward and press downward on lever 32 thus opening switch 31. When water later evaporates from the container, the spring bias raises the container, and this motion is transmitted via lever arm 32 to switch 31 thus closing the switch. This switch should be of the type described above in connection with the device of FIGURE 4.

A complete non-electric water control system is shown in FIGURE 6. Here a snap acting toggle valve, 33, having an inlet port, 34, and an outlet port, 35, is mounted on support member, 36. To an extension, 37, of the toggle valve arm is fastened a sponge or container, 39, via support, 38. A small diameter pipe, 40, bypasses a small portion of the water passing through the valve to the container, 39. The toggle valve is biased by a spring, 41, to return to the upward position shown in FIGURE 6, when container 39, is fully or partially emptied of water. When the toggle valve arm is in the upward position, as shown in FIGURE 6, water flows through the valve, a portion of which slowly falls into container, 39. When the weight of water received in container 39 is sufficiently great to overcome the summation of the internal bias in the toggle valve and in the auxiliary spring, 41, arm 37 snaps to a downward position thus closing the toggle valve. As water then evaporates from the container the bias in the spring 41 finally snaps the toggle lever arm to its original upper position thus opening the valve.

A suitable snap acting toggle valve for the above control system is sold under the name of Microvalve by Instruments, Inc. of Tulsa, Oklahoma. This valve is internally biased so that as the valve toggle arm is moved bias builds up in the flip-flop internal valve actuating member until this member suddenly moves to either an open or a closed position, dependent upon the position of the toggle arm.

In all of the above described water control systems, a portion of the water passing through the control valve is bypassed to a container associated with the valve control apparatus. In order to retard the rate of flow of this bypassed water, it is necessary to use very small tubing as a conductor, or install very small restricted orifices in the conductor. Where the desired rate of flow is very low, as is commonly the case, these restricted orifices must be so small that they constantly become clogged, even when strainers are used, because of foreign matter, rust or precipitated salts present in the water.

In order to eliminate this clogging problem, this slow rate of transfer of water to the valve-actuating apparatus can be accomplished by placing the said apparatus in such position that a portion of the spray from a sprinkling system will fall into the container. This of course is possible only when the water being controlled is being dispersed by means of a sprinkling system. However, even this method presents some problems. It is difficult to find a location for the said container so that it will fill at the proper rate in order that the period of irrigation will be that desired. Considerable experimenting is needed to find the proper location because of the irregular spray pattern of most sprinklers, and even then, variable wind movement can vary the rate of filling of the container from time to time. Also, any obstructions that may grow or be placed in the path of the spray will further aggravate the problem.

A very satisfactory non-clogging apparatus for obtaining a constant very small delivery of water from the downstream side of the valve is the water divider shown in FIGURE 2. Here a fine spray nozzle, 13, preferably equipped with a strainer, is installed in a side wall of a container, 12. The spray is directed toward an upright conduit 14, having holes, 17, drilled on the side that faces the spray nozzle. A friction-fitted movable sleeve, 15, provides a means for blocking entry of the sprayed water into any of the holes. Excess water, not collected by the water receptor conduit, 14, is released via port 16.

The water divider operates as follows: the spray from spray head 13 strikes the conduit, 14, and enters holes, 17, in the conduit that are not blocked off by sleeve 15. Water so collected drains off through conduit 14 into the container associated with the valve control apparatus, which should be located at a point below container 12. The excess uncollected spray, which may amount to as much as 99 percent or more of the total volume of the spray depending upon the total area of the ports open to receive the spray is discharged through port 16 to waste.

Instead of holes, conduit 14 may have one or more series of slots on the side of the conduit facing the spray, which act as ports. These again are partially blocked by sleeve 15. Another method of arrangement of the entrance port is shown in FIGURE 3. Here conduit 14 has a slot 18 milled longitudinally along the face towards the spray head. Sleeve 15 has a triangular section, 19, cut in its side, centered with respect to the slot it shields. A variable area port is then obtained by turning sleeve 15 about its axis.

It is obvious that the spray also may be arranged to spray downward in a vertical direction instead of horizontal as shown above. In this instance the bottom of container 14 becomes a water barrier or separator and the ports consist of holes drilled in the center of convex upward indentations in the bottom of the container. In this instance selected ports may be blocked by inserting large headed tacks in order to vary the volume of spray intercepted. A narrow trough with its opening facing the spray head also may be used to collect the desired amount of water, using a sleeve to vary its portal area.

In any of the above embodiments of the liquid divider the spray nozzle and water barrier with its variable portal entrance area need not be completely enclosed, although this is found to be a definite advantage inasmuch as this prevents wind from altering the spray pattern. It is at least advantageous to have side walls to shield the spray as shown in FIGURE 2.

In all of the water control systems illustrated, it is thus distinctly advantageous to employ a liquid divider such as that described as a means of obtaining a very small rate of flow from the downstream side of the valve for conduction to the container associated with the valve control apparatus. In the float switch systems shown in FIGURES 1 and 4, the liquid divider may be designed to fit over the float compartment of either switch, making a unitized package. With the gravity operated systems of FIGURES 5 and 6 it is best to locate the divider at a higher level than the containers associated with the valve control apparatus, conducting the small divided stream of water by gravity down to the containers via conduit.

In all water control systems described, the period of time that water flows during each irrigation can be increased by decreasing the rate of flow of water to the valve control container, and where a divider is used, this may be accomplished by decreasing the portal area. The length of time that elapses between applications of water will vary with the rate of evaporation of water from the valve control container. This of course is dependent upon the relative humidity and wind speed, but also may be varied manually by changing the area of water exposed to the air. Thus increasing the surface area of the water in the valve control container, such as for instance by increasing the area of sponge exposed to the air, will decrease the period between applications of water.

What is claimed is:

1. A water control system comprising a valve for controlling the flow of water that is responsive to a snap acting valve control means said means being actuated by a definite small portion of the water passing through said valve, said actuating water being obtained by means of a liquid divider comprising a small spray nozzle connected to the downstream side of said valve and a barrier having a variable portal area facing the spray from said nozzle so that a portion of said spray strikes said portal area, means to collect water intercepted by said portal area and conduct said collected water to said valve control device, means to dispose of excess spray not intercepted by said portal area, and provision for the controlled evaporation of said collected actuating water from said valve control means, with arrangement for said valve to close when said valve control device receives a definite amount of water and to open upon evaporation of a definite amount of water from said valve control means.

2. A water control system according to claim 1, wherein said valve is electrically actuated and said snap acting valve control means comprises an electric liquid level snap acting switch responsive to a definite change in volume of water collected in a container.

3. A water control system according to claim 1, wherein said valve is electrically actuated, and said snap acting valve control means comprises a snap acting electric switch responsive to a definite change in weight of water collected in a container.

4. A water control system according to claim 1, wherein said valve is electrically operated and said snap acting valve control means is a magnetic boat switch comprising a float chamber constructed of non-magnetic material, a float, a permanent magnet attached to said float, a magnetic reed switch placed in close proximity to said magnet so that said switch is operated by a definite change in volume of water in said float chamber, and means to provide for controlled evaporation of water from said float chamber.

5. A water control system according to claim 1, wherein said valve and snap acting valve control means comprise a snap acting toggle valve that is actuated by a definite change in weight of water in a container, and means to provide for the controlled evaporation of water from said container.

6. A water control system comprising an electrically actuated valve controlled by an electric float switch comprising a float chamber, a float, and a snap acting switch, means to divert a small portion of the water passing through said valve to said float switch chamber, and means to provide for the controlled evaporation of water from said float switch chamber, said float being arranged to actuate said snap acting switch to one or the other of its positions respectively in response to an increase or decrease of water in the float chamber to a predetermined amount.

7. A water control system according to claim 6, wherein said float chamber is constructed of non-magnetic material, a permanent magnet being attached to said float, said snap acting switch comprising a magnetic reed switch actuated to one or the other of its positions respectively responsive to the position of said magnet and said float, said snap acting switch being responsive to an increase or decrease of water in the float chamber to a predetermined amount.

8. A water control system comprising an electrically actuated valve responsive to a water-actuated switch, said water-actuated switch comprising a water-holding container, a snap acting electric switch responsive to the weight of water collected in said container, means to divert a small portion of the water passing through said valve to said container and means to provide for the controlled evaporation of water from said container, said snap acting switch being actuated to one or the other of its positions respectively responsive to an increase or decrease of water in said container to a predetermined amount.

9. A water control system comprising a water-actuated valve responsive to the weight of water collected in a container, said water-actuated valve comprising a water-holding container, a snap acting toggle valve, means to divert a small portion of the water passing through said valve to said container and means to provide for the controlled evaporation of water from said container, said snap acting valve being actuated to one or the other of its positions respectively responsive to an increase or decrease of water in said container to a predetermined amount.

10. A liquid divider comprising a spray nozzle through which the liquid to be divided is passed, a barrier in front of said nozzle having a variable portal area facing spray from nozzle so that a portion of said sprayed liquid enters said portal area and means to conduct the sprayed liquid passing through said portal area away from liquid divider, so that said collected liquid remains separate from the sprayed liquid not intercepted by said portal area.

11. A liquid divider comprising a spray nozzle through which the liquid to be divided is passed, a barrier in front of said nozzle having a variable area facing spray from nozzle for purposes of intercepting a portion of said sprayed liquid, and means to conduct said intercepted sprayed liquid away from said liquid divider so that said intercepted liquid remains separate from the sprayed liquid that is not intercepted.

References Cited in the file of this patent

UNITED STATES PATENTS

| | | |
|---|---|---|
| 2,116,415 | Shenton | May 3, 1938 |
| 2,495,149 | Taylor | Jan. 17, 1950 |
| 2,965,117 | Gallacher | Dec. 20, 1960 |